INVENTOR.
James R. McKee

April 3, 1962   J. R. McKEE   3,028,260
METHOD OF COATING CONTAINERS
Filed Sept. 5, 1958   4 Sheets-Sheet 4

INVENTOR.
James R. McKee
BY Green, McAlister & Miller
HIS ATTORNEYS 3,028,260
METHOD OF COATING CONTAINERS
James R. McKee, Muncie, Ind., assignor to Ball Brothers Company, Incorporated, Muncie, Ind., a corporation of Indiana
Filed Sept. 5, 1958, Ser. No. 759,286
4 Claims. (Cl. 117—94)

This invention relates to a method and apparatus for coating articles such as glass containers with surface coatings of protective material and particularly surface coatings of a plastic such as plastisol.

An object of the invention is to produce procedure for applying a coating such as a coating of plastic material to the external and/or internal surface of an article of commerce such as a container and then subjecting the coated article to processing such as is essential to the production of a permanent and protective coating on the article.

A further object is to produce apparatus and procedure for coating articles such as glass containers, with a plastic material and then processing the coated articles for the purpose of curing the plastic material and thereby producing a permanent and protective coating on the surface of the article.

A further object of my invention is to provide a coating machine which so immerses an uncoated article in a bath of coating material that coating material is applied uniformly to the surface of the article and entrapment of air in the applied coating material is avoided.

An additional object of the invention is to provide a machine for coating articles such as glass containers and which rotates and inverts each newly coated article in order to avoid the formation of a tear or tears which would otherwise flow down the side of the coated article and mar or tend to mar the surface of the newly applied coating.

A further object of the invention is to produce a method of applying coatings to glass articles in such a way as to avoid air entrapment on the bottom of the article and the production of so-called tears on the surface of the applied coating.

Further objects of the invention will be made apparent throughout the following description of the invention.

In the drawings,

FIGURE 8 is a wiring diagram of the control system employed in the machine illustrated as the now preferred embodiment of one phase of my invention.

The machine constituting an embodiment of one aspect of my invention includes in its make-up a movable support for a receptacle for liquid coating material to be employed in coating separate articles such, for example, as glass containers. The machine also includes mechanically actuated means for successively immersing articles to be coated in the coating material contained in the receptacle, moving the article through the receptacle as it is being coated, then removing the coated article from the receptacle, tilting and finally inverting the article so removed while it is moving above and along a drip channel for receiving excess coating material drained off and dripping from the article and while the article so moving is also being rotated about an axis of rotation, preferably coincident with the major axis of the article or an axis of rotation parallel to the major axis and located between the side walls of the article.

The rotation of each coated article is for the purpose of causing a uniform distribution of the coating material on the surface of the article and to avoid the formation of tears or other irregularities on the surface of the coating material. The machine also moves each article while inverted, into and through a heating chamber where the coating material is dried and/or cured. Each article leaving the heating chamber moves into and through a cooling chamber and toward an unloading station of the machine where it is removed from the conveyor and packed in cartons preliminary to shipment of the coated articles.

Figure 1:
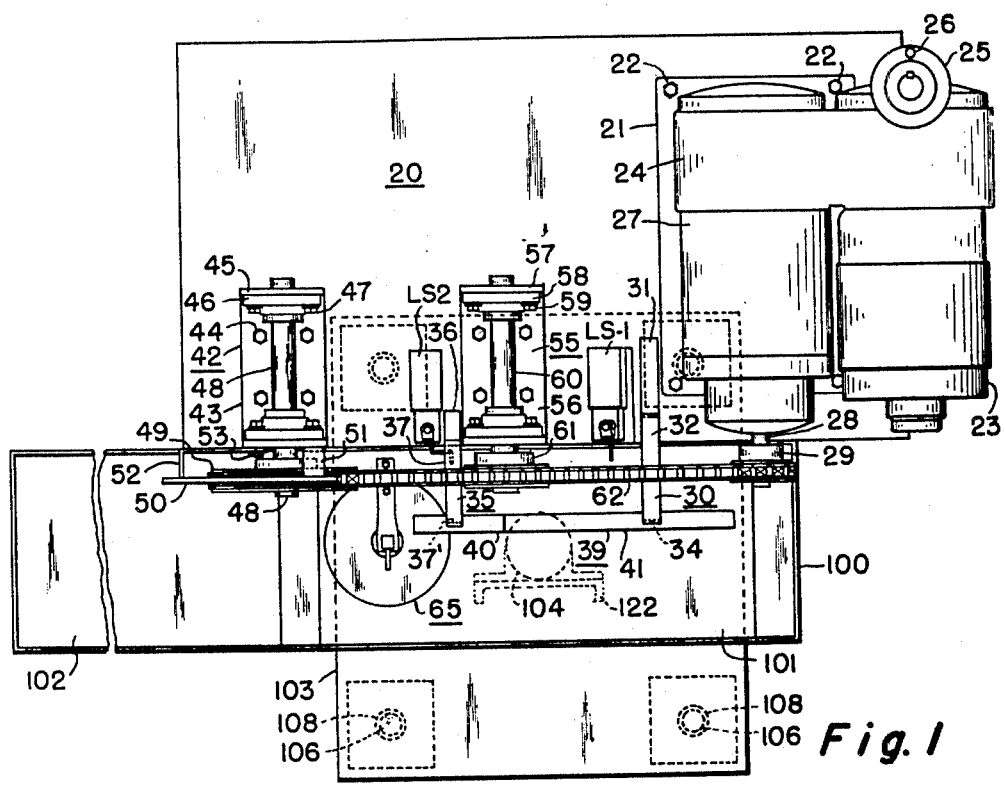
FIGURE 1 is a plan view of an article coating machine embodying one aspect of my invention.
Figure 2:
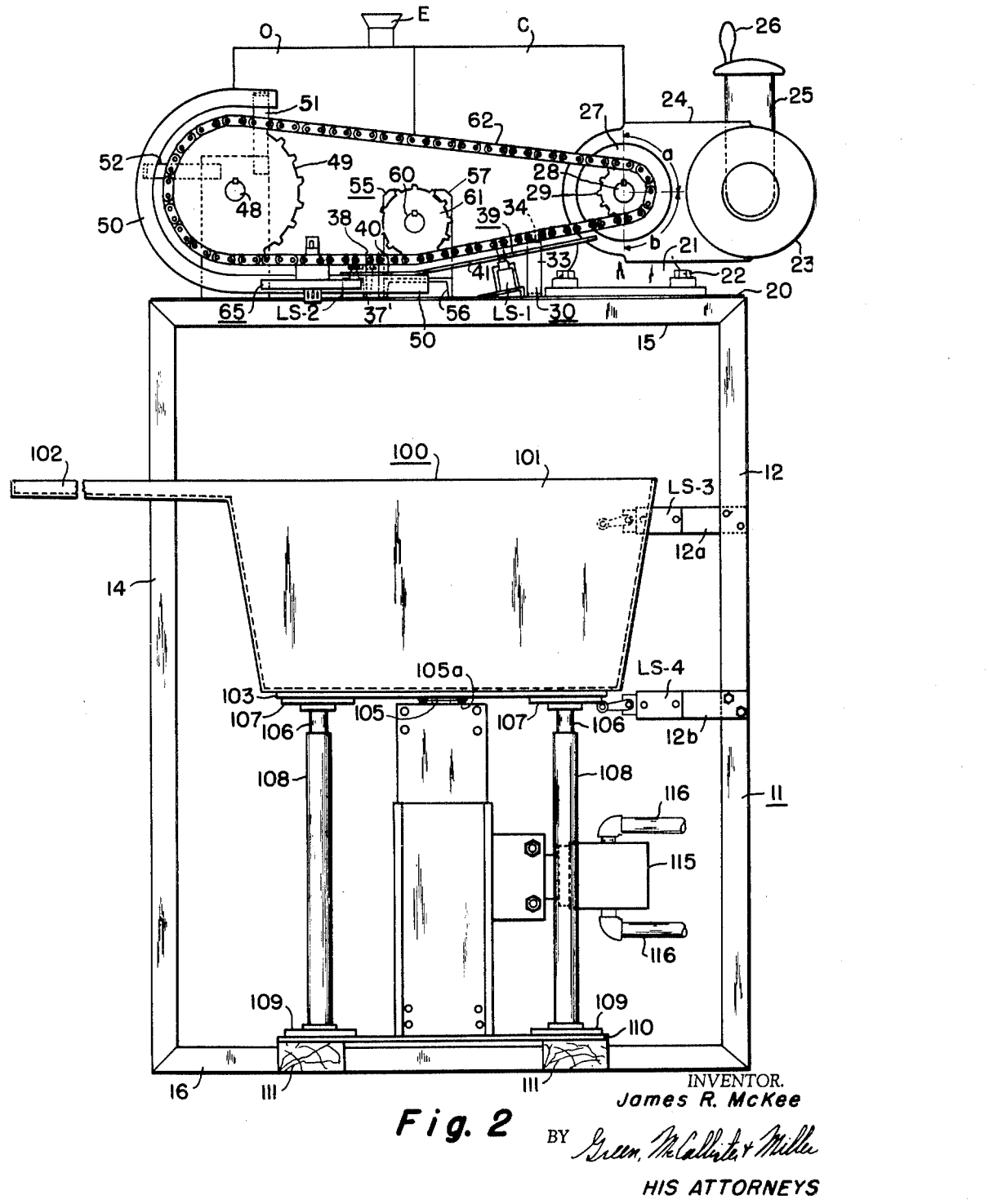
FIGURE 2 is a front elevation of the machine disclosed in FIGURE 1.
Figure 3:
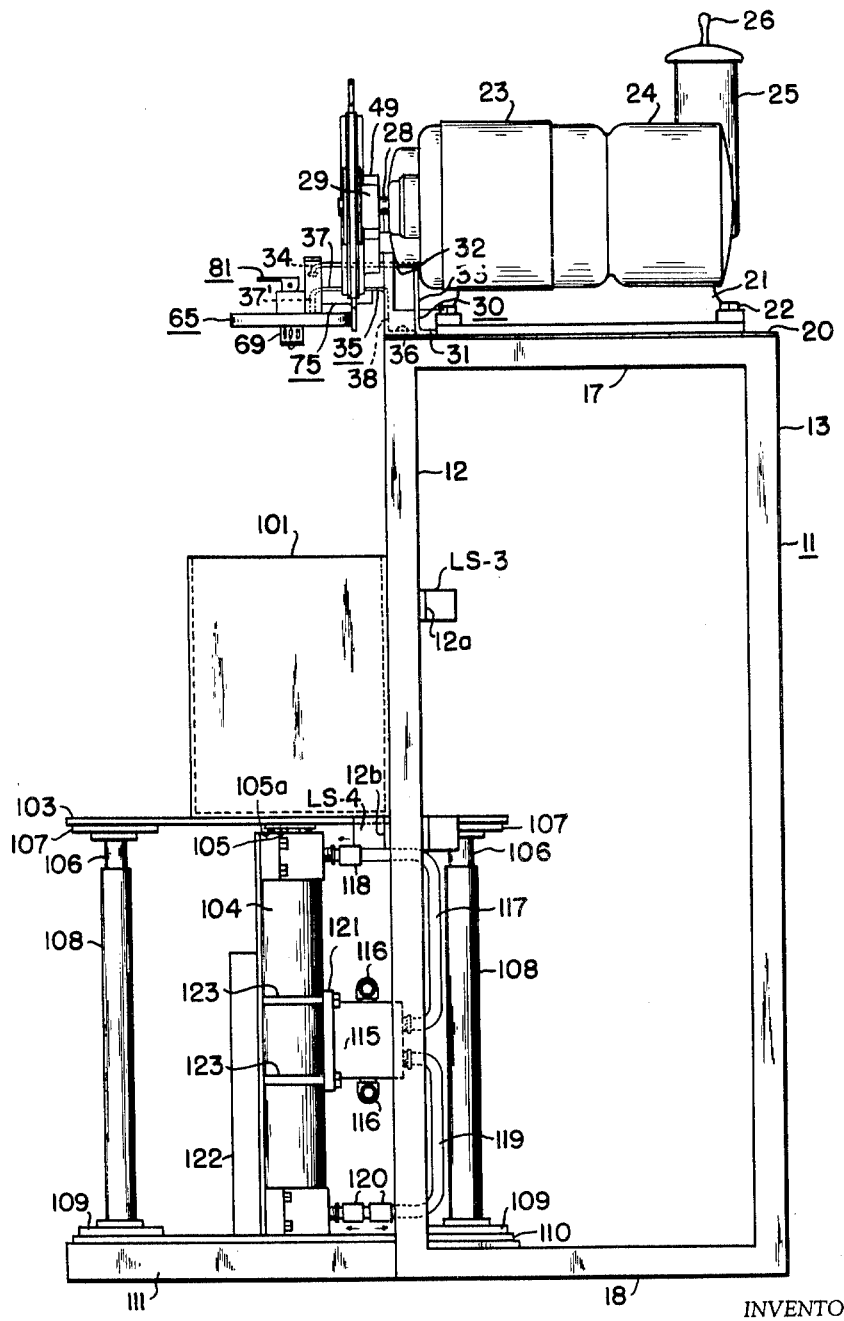
FIGURE 3 is a side elevation of the righthand side of the machine shown in FIGURE 2.

Referring now particularly to FIGURES 1, 2, and 3, the machine illustrated as an embodiment of one feature of the invention, includes a rectangular frame support structure 11 having four upright support members of which only three members, viz., members 12, 13, and 14 are shown in the drawings. The upright supporting members are connected across the top thereof by longitudinal top frame members 15 and transverse top frame members 17. The upright members are also connected together at the bottom by longitudinal bottom frame members 16 and transverse bottom frame members 18. A top plate 20 is secured to top frame members 15 and 17.

A mounting frame 21 is secured to the plate 20 adjacent one end thereof by means of bolts 22. As shown, the mounting frame 21 supports a variable speed electric motor 23, a reduction gearing housing 24 and a power take-off unit 27. The gear housing 24 is mounted transversely across the end of the motor 23 and power take-off 27, is provided with a manually operated speed control device 25 which can be manually adjusted by a rotatable handle 26. The power take-off unit 27 is provided with a drive shaft 28 having a sprocket 29 keyed thereon.

A rectangular bracket 30 is positioned on and secured to the plate 20 adjacent the mounting frame 21. The bracket 30 includes in its make-up a horizontally disposed flange portion 31 (FIG. 3) which is secured to the top plate 20, a vertically disposed upright intermediate portion 33, a horizontally disposed flange portion 32 (see FIGURE 3) extending outwardly beyond the frame 11, and a short downwardly disposed flange portion 34.

A second rectangular shaped bracket member 35 (FIGURES 1 and 3) is positioned on and secured to the top plate 20 so as to lie substantially parallel to bracket 30 although longitudinally spaced therefrom. Bracket member 35 comprises a horizontally disposed flange portion 36 which is secured to top plate member 20, a vertically disposed intermediate portion 38, a horizontally disposed flange portion 37 extending outwardly beyond the frame 11, and a short downwardly disposed flange portion 37'.

A hanger assembly guide member 39 having a horizontal portion 40 and an upwardly inclined portion 41 is secured, intermediate its ends, to flange portions 34 and 37'. Flange portion 37' is secured to horizontal portion 40, and flange portion 34 is secured to inclined portion 41 of the guide member 39 in such manner as to position that portion of the guide 39 upwardly and forwardly of the top plate 20.

A sprocket mounting assembly 42 is positioned on the top plate 20 and is spaced from but extends substantially parallel to the frame 21 on which the motor 23 is mounted. The assembly 42 includes in its make-up a relatively long intermediate portion 43, which lies flat against, and is secured to top plate 20 by bolts 44 (FIG. 1). The plate is provided with end flanges 45 which project vertically upwardly and each constitutes a support for a separate bearing housing 46 which is secured thereto by bolts 47. A freely rotatable shaft 48 projects through the bearing housings 46 and the end flanges 45 and a sprocket wheel 49 is keyed to one overhanging end thereof. The sprocket wheel 49 is operatively coupled to the sprocket 29 by a sprocket chain 62 and is driven by the motor 23 by means of the reduction gearing and shaft 28 (FIGURES 1 and 2). An idler sprocket 61 meshes with the lower run of the chain 62 at a point substantially midway between the sprocket wheel 49 and the sprocket 29. The sprocket 61 applies tension to the chain 62 and is mounted on the end of shaft 60 adjacent one end flange 57 of a plate 56 which is secured to the top plate 20 with its end flanges 57 projecting upwardly. A bearing housing 58 is secured to each end flange 57 by means of bolts 59 and the shaft 60 is journaled in the bearings on the bearing housings and projects through apertures formed in each of the flanges 57. The sprocket 61 is keyed to an overhanging end of the shaft 60.

A cam track 50 partially surrounds the sprocket 49 and is secured to the plate 43 by means of brackets 51, 52, and bolts 53.

Figure 4:
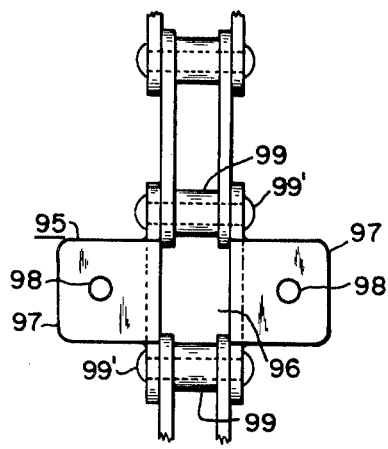
FIGURE 4 is an enlarged detailed plan view of a portion of the upper run of a conveyor chain disclosing one of several clamp-device supports with which the chain is equipped.
Figure 5:
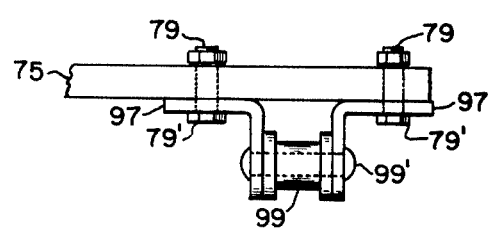
FIGURE 5 is a front elevation of the support shown in FIGURE 4 and disclosing the position the support occupies with relation to the conveyor chain, as it moves along the upper run of the chain.
Figure 6:
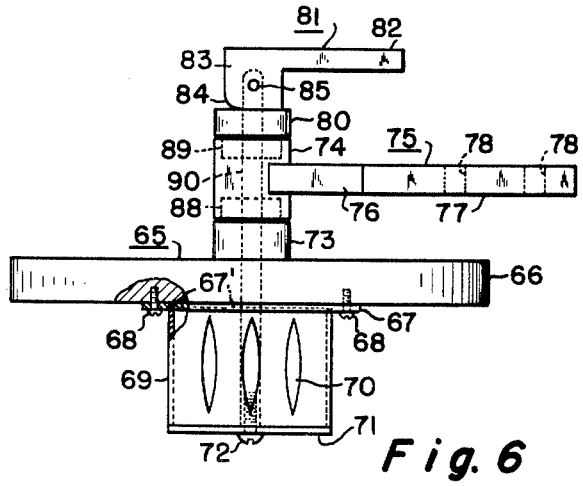
FIGURE 6 is an enlarged detailed elevational view, partially in section of a hanger assembly employed as a support for a glass article as it is moved by a chain conveyor such as forms a part of the machine illustrated in FIGS. 1, 2, and 3.
Figure 7:
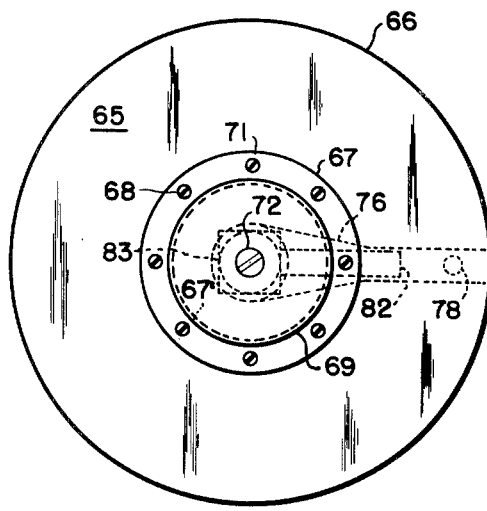
FIGURE 7 is a bottom plan view of the hanger assembly shown in FIGURE 6.

A hanger assembly 65 is secured to the chain conveyor 62 by means of mounting assemblies 95 (FIG. 4). The assembly 65 includes means for receiving and carrying a container such as a jar or bottle, as it moves with the chain conveyor 62. As shown in FIGURES 6 and 7, each hanger assembly includes a conveyor engaging rod 75 having a wide inner end 76 integrally formed with a bearing housing 74, and a narrow outer end 77 which is provided with apertures 78 which complement apertures 98 in the mounting assembly 95. Bolts 79' (FIG. 5) pass through these complementary apertures and secure the hanger assembly 65 to the chain conveyor 62.

Each hanger assembly includes a flexible member 69 which is in the form of a hollow cylinder (FIG. 6). It is adapted to support a container during the operation of coating the container, rotating and then inverting the coated container, and then passing it through the heating and cooling chambers O and C diagrammatically disclosed in FIGURE 2. As shown in FIGURE 6, the flexible member 69 is operatively secured to a circular disc 65 which is provided with what may be termed a circular cam surface 66 which forms the bounding edge of the disc. The member 69 is centrally mounted on the lower face of the disc 65 and, as shown, is located between a circular plate 71 which engages its lower end and a plate 67 secured to the disc 65 by screws 68. The plate 67 is provided with a circular recess 67' which receives the upper end of the member 69. A number of spaced vertically extending slits 70 are formed in the member 69 for the purpose of contributing to its effectiveness as a support for articles to be coated. The plate 71 is rotatably supported on a cylindrical actuating rod 90 by means of a screw 72.

The disc 65 is also rotatively mounted on the rod 90 and is provided with a cylindrical lug 73 which may be termed a bearing lug. The lug is located centrally of the disc, is provided with a central aperture to receive the rod 90 and a cylindrical extension 88 of reduced diameter, which interfits with a recess of slightly larger diameter formed in the lower face of the bearing housing 74. The rod 90 passes through a central aperture formed in the bearing housing 74 and a central aperture in the disc 65 and is secured at its upper end to an actuating lever 81 which is provided with a lever arm 82 and a bifurcated bearing portion to which the rod 90 is pivotally secured by a pivot pin 85 which extends transversely through the bifurcated portion of the lever. The lever engages the upper surface of a contact member 80 which is supported on the bearing housing 74 and is provided with a cylindrical extension 89 of reduced diameter, which projects into a circular aperture formed in the upper face of the housing 74, to form an interfitting connection between the housing and the plate 80.

The bifurcated end of the lever is provided with parallel cam surfaces 84 located thereon so as to engage the plate 80. When the lever 81 is in one position with relation to the rod 90, the flexible member 69 is not flexed, however, when the lever 81 is moved to a position at an angle to that shown in FIGURE 6, the cam surfaces 84 moving in engagement with the contact plate 80, raise the rod 90 and the plate 71 to thereby flex or compress the flexible member 69 between the plates 67 and 71 and cause the portions of the member 69 located between the spaced slits 70 to billow outwardly and, in this way, move into supporting engagement with the inner surface of the neck of the bottle or jar surrounding the flexible member 69.

As noted, the hanger assemblies are spaced at equal intervals along the conveyor chain 62. As also noted, each such assembly is secured to a separate mounting assembly 95 which is included in the make-up of the conveyor chain. FIGURE 4 discloses that the chain is made up of a number of pairs of spaced links which are secured together in end to end relationship by pins 99', with each pair of links spaced apart by means of spools 99, each of which is mounted on a separate one of the pins 99'. Each mounting support consists of a pair of specially formed links, each of which is provided with an integrally formed, laterally projecting plate or wing 97. As shown in FIGURES 4 and 5, the wings are so located on the specially formed links that they project laterally from the upper portion of the chain as it moves through its upper run and project laterally from the lower portion of the chain as it moves through its lower run.

Each wing 97 is provided with an aperture 98 and the apertures 98 formed in the two wings of each mounting assembly are spaced apart so as to correspond to the spacing between the apertures 78 formed in each conveyor-engaging rod 75 forming a part of a hanger assembly. FIGURE 5 discloses a portion of one rod 75 secured to the wings 97 of a mounting assembly.

As clearly shown in FIGURES 2 and 3, a reservoir and drain channel assembly 100 is located below the conveyor chain 62 and the hanger assemblies secured thereto. The reservoir 101 is normally filled to the desired level by a solution of material for coating the articles carried by the hanger assemblies 65. The drain channel 102 is disclosed as formed integrally with the reservoir and is so arranged that coating material dripping from each coated article (bottle or jar) as it is removed from the reservoir is received by the channel and therefore flows back into the reservoir 101.

In the apparatus illustrated, the reservoir 101 is mounted on a platform which moves up and down in synchronism with movements of the chain 62 so that it contributes to an effective immersion of each article carried by the chain, in the coating material within the reservoir and also the removal of the same from the coating material in such a way as to produce a uniform coating on each such article, which is free from surface blemishes. To obtain such a coating and particularly a coating which is free from tears, trapped air or other blemishes, it is necessary or desirable to introduce each article to be coated into the coating material so that the major axis of the article is inclined to the vertical at such an angle that a portion only of the bottom edge of the article first contacts and then dips into the coating material in the reservoir 101. It is also necessary to so manipulate the reservoir that each article to be coated will enter and leave the coating material without contacting the wall of the reservoir or any part of the drain channel 102. It is for this reason that I provide means for automatically raising and lowering the receptacle 101 during the operation of coating of each article moved by the conveyor chain 62.

In FIGURES 2 and 3 I have shown an elevator platform 103 as the support for the reservoir tank 101. The platform is supported by a plunger 105 which forms a part of a piston and cylinder combination such as illustrated, in which the cylinder is designated by the numeral 104 and the plunger is actuated by a piston within the cylinder. The platform is guided in its up and down movements by guides 106 each of which telescopes with a separate guide cylinder 108 supported on a base plate 109 which, in turn, is mounted on and secured to the foundation plate 110. As shown, the foundation plate 110 is mounted on a shock absorbing semi-resilient base 111.

The piston and cylinder combination is preferably a part of a hydraulic operating system for the platform 103. The cylinder 104 is disclosed as provided with a control valve 115 to which operating fluid is delivered under pressure through conduits 116 by a pump, not shown, which is actuated by a motor M shown only diagrammatically in the wiring diagram of FIGURE 8. A conduit 117 controls the delivery of actuating fluid to and from the upper end of the cylinder 104 and for that purpose is provided with a valve 118. Similarly, a conduit 119 and control valve 120 control the delivery of actuating fluid to the lower portion of the cylinder 104. The valves are so controlled as to accomplish the synchronization of the movements of the platform with those of the conveyor chain 62.

As shown in FIGURES 1 and 2, a microswitch LS-1 is so located on the top plate 20 that it is positioned adjacent the inclined portion 41 of the guide 39. A second micro switch LS-2 is mounted on the top plate 20 at a point adjacent the horizontal portion 40 of the guide 39. A third micro switch LS-3 is positioned on the support 12 (FIGURES 2 and 3) by means of a support bracket 12a which is adjustable to different positions along the support member 12. A fourth micro-switch LS-4 is mounted on a bracket 12b which is located below the bracket 12a and preferably is also adjustable to different positions along the support member 12. The switch LS-1 is normally open and the switches LS-2, LS-3, and LS-4 are normally closed.

In the operation of coating a container the conveyor 62 is started by delivering current to the motor 23. As an assembly 65 passes the loading zone $b$, indicated in FIGURE 2, a container to be coated is attached thereto as previously described in connection with the description of FIGURE 6. As the assembly 65 moves downwardly along the inclined portion of the guide 39 the rod 75 forming a part of the assembly, engages and closes the normally open switch LS-1. This energizes the solenoid S (indicated only in FIG. 8) to supply actuating fluid to the lower end of the cylinder 104 through the conduit 119 to thereby raise the tank 101. As will be described in connection with the wiring diagram (FIG. 8), the energizing of the relay R-1 closes the circuit in which the solenoid S is located, the micro switch LS-3 located in that circuit being closed. Upon the delivery of actuating fluid to the lower end of the cylinder 104 the plunger 105 thereupon moves the platform 103 upwardly, thus raising the dip tank 101 to its uppermost position. The upward movement of the platform 103 releases the normally closed switch LS-4 which opens automatically. As the hanger assembly 65 and the container attached thereto, move downwardly along the inclined portion 41 of the guide 39, the tank 101 moves upwardly to a position such that the downwardly moving container contacts and moves into the coating liquid contained in the tank. The angle of inclination of the guide portion 41 determines the angular position of the bottom of the container as the container contacts and moves into the liquid within the tank 101. This angular relationship between the container and the surface of the coating liquid is, as previously stated, necessary to avoid entrapment of air at the bottom of the container and it also avoids undue agitation of the liquid within the container. I have found that the angle between the bottom of the container and the surface of the liquid may be from 10° to 45°, but that the best results are obtained when the angle is from 10° to 20°.

As the hanger assembly is conveyed along the guide 39 the rod 75 of the assembly, engages and open the switch LS-2, thereby shutting off the delivery of current to the motor 23 and stopping the movement of the conveyor chain and, consequently, of the assembly 65. The tank 101, however, continues its upward movement until it engages and opens the switch LS-3. Opening the switch LS-3 de-energizes the solenoid S, with the result that the valve 115 is reversed, thus stopping the delivery of actuating fluid to the lower end of the cylinder 104 and starting the delivery of actuating fluid to the upper end of that cylinder 104 through the conduit 117. Thus the downward movement of the platform 103 and the dip tank 101 is initiated substantially as soon as the tank reaches the top of its stroke. During this downward movement of the tank excess coating material drips from the coated container and is received by the descending tank. It is noted that the switch LS-2 is located opposite the horizontal portion 40 of the guide 39 (see FIG. 1). Therefore, at the time the rod 75 of the hanger assembly engages the switch LS-2 the container carried by the assembly moves from an inclined to a vertical or upright position and in that position moves out of the coating liquid and away from the container 100.

As the elevator table reaches the lower end of its travel it engages and closes the switch LS-4, thus again delivering current to the conveyor actuating motor 23 and, consequently, continuing the movement of the assembly 65 and the freshly coated container carried by it. During the initial portion of this movement the drain channel 102 catches drippage of coating material from the coated container and conveys it back into the tank 101. The continued movement of the conveyor inverts the coated container as it moves around the sprocket 49 and then moves first through a heating chamber O and then through a cooling chamber C (FIG. 2). The temperature in chamber O is sufficient to dry or cure the coating material on the container. On leaving the cooling chamber the container has reached a temperature such that it can be conveniently handled and it is removed by the operator as it passes the so-called unloading zone $a$, indicated in FIGURE 2. The conveyor chain 62 continues to move and on receiving an uncoated article at zone $b$, the cycle of operation is repeated.

A reference to the wiring diagram of FIGURE 8 will aid the disclosure of the operation of the apparatus just commented upon. As there shown, the wires V and V-1 receive line voltage. The wire F which is connected to both of the wires V and V-1 includes two manually operated switches, one previously referred to and designated by the word "start" and the other also in the form of a push button switch, is designated by the word "stop." The flow of current through the wire F to the motor 23 is also controlled by the switch LS-2 when the manually operated switches ("start" and "stop") and switch LS-4 are closed. As shown, switch LS-4 is located in by-pass wiring $f'$ and is positioned in parallel with the switch LS-2 so that the closing of either the switch LS-2 or LS-4 will deliver current to the motor 23 when the manually operated switches are both closed. As shown in the diagram, the manually operated switches or extensions thereof, also control the flow of current through wire G to the pump motor M. The motor M actuates a pump, not shown, which delivers motive fluid to the valve 115. It will be apparent that this pump and the motor actuating it, may be replaced by an electrically actuated valve for delivering steam, compressed air, or some other fluid under pressure, to the valve 115.

The switch LS-1 is disclosed in the diagram as located in a wire H which delivers line voltage to a relay R-1 and energizes it. The energized relay actuates two electrical contacts R-1C-1 and R-1C-2. These contacts are located in series relationship in wire I which delivers current to the solenoid S. Current flow through this wire I is also controlled by the switch LS-3 because the wire I is electrically connected to the wire H by a cross wire $w$ which is connected to the wire I at a point between the two sets of contacts R-1C-2 and R-1C-1 and also between the switch LS-3 and the solenoid S. The wire $w$ also connects with wire H at a point between the switch LS-1 and the relay R-1. Thus after the relay R-1 is energized by the closing of the switch LS-1, it continues to be energized after LS-1 is opened, by the delivery of current through wire I, switch LS-3, contacts R-1C-2, wire $w$ and part of the wire H.

It will be recalled that the energized solenoid S operates to position the valve 115 so that actuating fluid is delivered to the lower end of the cylinder 104, and when deenergized the solenoid S accomplishes or initiates a reverse shifting of the valve 115 such that actuating fluid is delivered to the upper end of the cylinder.

Referring to the operation of the apparatus in connection with the wiring diagram, it is noted again that the switch LS-1 is normally open whereas the switches LS-2, LS-3, and LS-4 are each normally closed. When an assembly 65 carrying a container to be coated, actuates the switch LS-1, it closes that switch and, therefore, delivers energizing current to the relay R-1. The relay responding to the delivery of current to it, closes both the contacts R-1C-1 and R-1C-2 located in wire I. Upon the closing of these contacts, energizing voltage is delivered to the solenoid S by wire I through the closed switch LS-3 and the closed contacts R-1C-2 and R-1C-1. When the switch LS-3 is closed and contact R-1C-2 is also closed the cross wire $w$ connects the relay R-1 with the source of energizing current after the switch LS-1 is opened and the solenoid continues to receive energizing current until the switch LS-3 is opened by the upwardly moving container 101.

From the foregoing it will be apparent that the closing of the valve LS-1 by an assembly 65 moving downwardly along the inclined portion 41 of the guide 39 will deliver energizing current to the solenoid S and thus shift the valve 115 to a position such that the elevator table 103 is moved upwardly by the plunger 105, it being understood that at the time the switch LS-1 is momentarily closed by the movement of an assembly 65, all of the other LS switches are closed, but the line I remains open until the contacts R-1C-2 and R-1C-1 close that line. Thus as soon as the relay R-1 operates in response to the closing of the valve LS-1 the solenoid S receives energizing current. This current continues to flow to the relay R-1 after the switch LS-1 moves to its normally open position and until switch LS-3 is opened by the upward movement of the tank 101.

The de-energizing of the solenoid S shifts the position of the valve 115 and, consequently, the platform 103 and the container 100 move downwardly and as the platform reaches the limit of its downward movement it closes the valve LS-4 and thereby again delivers actuating current through the wire $f'$ and wire F to the conveyor actuating motor 23, it being recalled that the movement of the assembly 65 along the horizontal portion of the guide 39 caused the assembly arm 75 to move the valve LS-2 to the open position and stop the motor 23.

In view of the fact that the position of the switch LS-3 is adjustable along the support 12, it is possible to control the upper position reached by the tank 101 and, in this way, control the extent to which coating material is applied to each container carried by the assembly 65. It will also be apparent that the position of the switch LS-3 may be adjusted so as to effectively coat containers of different lengths.

The starting of the conveyor chain 62 by the closing of the switch LS-4 causes the assembly rod 75 to move out of contact with switch LS-2 so that it again moves to the closed position. As the conveyor chain 62 is again actuated, the cam surface 66 of the disc forming a part of the hanger assembly 65 continues its movement along the cam track 50 and the disc forming a part of the assembly is caused to rotate by its engagement with the cam track 50 and rotates the container carried by the assembly. The extent of this rotation may be gauged so that as the assembly moves around the sprocket 49 the container attached to the assembly 65 is rotated through one complete revolution while being inverted. The revolving of the container is desirable, if not necessary, to prevent the formation of a tear or tears on the coating material as it moves or tends to move on the surface of the container during the rotation and inverting of the container.

As indicated in FIGURE 2, the container carried by the assembly 65 enters the heating or curing oven O as, or just before it is fully inverted. The oven is maintained at a temperature from about 400° to about 450° F. and any available means of heating the oven may be employed. However, I have found that it is advisable to equip the oven with an exhaust system to carry away fumes which result from the heating or curing of the plastic coating material. In the drawings I have shown the oven provided with an exhaust passage E.

As the coated container leaves the oven it enters the cooling chamber C. A blower (not shown) may be employed in connection with the chamber C for the purpose of circulating cooled air through the chamber in order to provide uniform cooling of each coated container moving through that chamber. As the container and the assembly 65 to which it is secured, arrive at the unloading zone $a$ the container is removed from the hanger assembly 65 by lifting the lever 82 and, in this way, lowering the plate 71 of the assembly so as to permit the flexible member 69 engaging the container, to assume its normal shape and release the container.

The coating material which is supplied to dip tank 100 may be of one of a variety of plastisols. The material, preferably, should be of such a consistency that the dipping operation can be accomplished at room temperature. A basic formula, suitable for this purpose but given only for purposes of illustration, is the following:

| | |
|---|---|
| Poly vinyl chloride resin | 100 parts. |
| Di-iso octyl phthalate plasticizer | 30 parts per hundred resin. |
| Di-2-ethylhexyl azelate plasticizer | Do. |
| Epoxy-type plasticizer | 8 parts per hundred resin. |
| Barium-cadmium stabilizer | 3 parts per hundred resin. |
| Organic inhibitor | 1 part per hundred resin. |

This formula can be greatly modified to change the coating thickness by increasing or decreasing the amount of plasticizer in proportion to the amount of resin employed. The plasticizer content of the formula may be changed so that the plasticizer will make up 33 to 45% of the total resin content of the formula. To obtain an opaque coating, fillers of the barium sulfate type or calcium carbonate type may be added to the coating material. Colors may also be added as desired for depth of tone. Although various types of organic inhibitors can be used, a liquid barium zinc type stabilizer has been found to give satisfactory results.

Where a coating material, such as disclosed, is employed the time of heating the article can be varied so as to obtain complete polymerization of the coating, by proportioning the length of the heating chamber to the rate of travel of the coated article as it moves through that chamber. It will also be apparent that the article entering the coating material may be either cold or heated and that the number of containers coated and cured at one time is limited only by limitations of space and man power.

While I have disclosed apparatus and procedures for coating containers as embodiments of my invention, it will be apparent that various changes, additions, and even omissions may be made in both the apparatus and the procedure without departing from the spirit and scope of my invention as defined by the appended claims.

What I claim is:

1. A method of coating a surface of a container which comprises, moving a container downwardly into contact with a pool of coating liquid while maintaining such container at a pre-determined inclination to the horizontal and simultaneously moving such pool upwardly, discontinuing the downward movement of the container while continuing to move the pool upwardly to a predetermined height, reversing the movement of the pool by initiating a downward movement thereto to provide a relative withdrawal of the container from the pool, discontinuing the downward movement of the pool, inverting the container and simultaneously rotating it about its longitudinal axis, and moving the inverted container through a heating chamber and then a cooling chamber.

2. A method of coating a container which comprises, inclining the longitudinal axis of a container to the horizontal, downwardly immersing such inclined container in a pool of coating liquid while simultaneously moving the pool upwardly, moving the longitudinal axis of the container to the vertical and continuing the upward movement of the pool to a predetermined height, reversing the movement of the pool to relatively withdraw the container from the coating liquid, inverting the container while moving it away from the pool, and drying such container while so inverted.

3. A method of coating a surface of a container which comprises the steps of introducing a container into a coating liquid while maintaining the longitudinal axis of the container at an inclination of about 10° to 20° to the horizontal so as to avoid entrapment of air between the lower surface of the container and the surface of the coating liquid, uprighting the container while in contact with the liquid so as to move the longitudinal axis of the container to a vertical position, relatively withdrawing the container from the liquid, inverting the position of the container about an axis perpendicular to the longitudinal axis of the container and simultaneously rotating the container about its longitudinal axis to prevent the formation of tears in the coating material, and then drying and cooling the thus-coated container.

4. A method of coating a surface of a container which comprises, moving a container to an inclined position, introducing the container into a pool of coating liquid by simultaneously lowering the container and raising the pool of coating liquid while maintaining the container in its inclined position to avoid entrapment of air between the surface of the coating liquid and the bottom of the container, moving the container to an upright position while continuing to immerse it in the liquid to a predetermined height, relatively withdrawing the upright container from the liquid by lowering the pool, then inverting the container and simultaneously rotating it about its longitudinal axis to inhibit the formation of tears in the coating, and while in an inverted position subjecting the container to a drying temperature.

References Cited in the file of this patent

UNITED STATES PATENTS

| | | |
|---|---|---|
| 1,143,464 | Todd | June 15, 1915 |
| 1,689,062 | Titchener | Oct. 23, 1928 |
| 2,044,077 | Jones | June 16, 1936 |
| 2,112,245 | Luckhaupt | Mar. 29, 1938 |
| 2,174,514 | Hothersall | Oct. 3, 1939 |
| 2,544,199 | Vredenburg | Mar. 6, 1951 |
| 2,573,660 | Brownell | Oct. 30, 1951 |
| 2,755,205 | Robb et al. | July 17, 1956 |